United States Patent [19]

Cunningham

[11] 4,332,214
[45] Jun. 1, 1982

[54] HEATED BED FOR ANIMALS

[76] Inventor: Lee Cunningham, Drawer YY, Incline Village, Nev. 89450

[21] Appl. No.: 87,142

[22] Filed: Oct. 22, 1979

Related U.S. Application Data

[63] Continuation-in-part of Ser. No. 807,216, Jun. 16, 1977, abandoned.

[51] Int. Cl.³ .............................................. A01K 1/035
[52] U.S. Cl. ......................................... 119/1; 119/19; 119/33
[58] Field of Search ......................... 119/1, 15, 19, 33; 5/348 WB, 422; 219/217

[56] References Cited

U.S. PATENT DOCUMENTS

| | | | |
|---|---|---|---|
| 1,041,167 | 10/1912 | Rogers | 119/33 |
| 3,367,308 | 2/1968 | Quattrone et al. | 119/15 |
| 3,413,958 | 12/1968 | Artig | 119/15 |
| 3,464,388 | 9/1969 | Stout | 119/15 |
| 3,585,356 | 6/1971 | Hall | 5/422 X |
| 4,201,153 | 5/1980 | Nace | 119/15 X |

*Primary Examiner*—Hugh R. Chamblee
*Attorney, Agent, or Firm*—Larson and Taylor

[57] ABSTRACT

A protective, heated bed or support is disclosed suitable for use in the care and treatment of sick, injured, weak or young animals, such as human beings, dogs and cats, reptiles and birds, hereafter referred to as animals, for brevity. The bed is comprised of a support that includes an outer container or shell of any suitable material having attached thereto or integral therewith a heating unit, such as an electrical resistance heater. Supported within the outer shell is an inner shell having a floor and surrounding walls of hard vinyl plastic or other easily sanitized, puncture resistant material capable of supporting the animal as well as resisting the rough treatment such a surface would endure. The inner and outer shells are shaped so as to define an interior volume having a U-shaped cross section suitable for containing a liquid having a high thermal capacity such as water. This interior volume is accessable by a port which may conveniently be located in the upper rim that connects the inner shell to the outer shell. Thermostatic controls are provided on the exterior surface of the outer shell for controlling the heat of the electrical heater which is carried by conduction through the outer shell and the water to the inner shell and from there, of course, to the animal resting thereon. The interior volume of the walls provide a reservoir of heated water which serves to both surround the animal with warmth and also provides a reservoir of water to insure that the water level does not fall below the floor of the inner shell. In a further particular embodiment the bed also comprises a dome mounted on the support but spaced from the upper rim so as to allow air flow into the bed. Adjustable vents are located on the top of the dome to control the air flow out of the bed.

2 Claims, 10 Drawing Figures

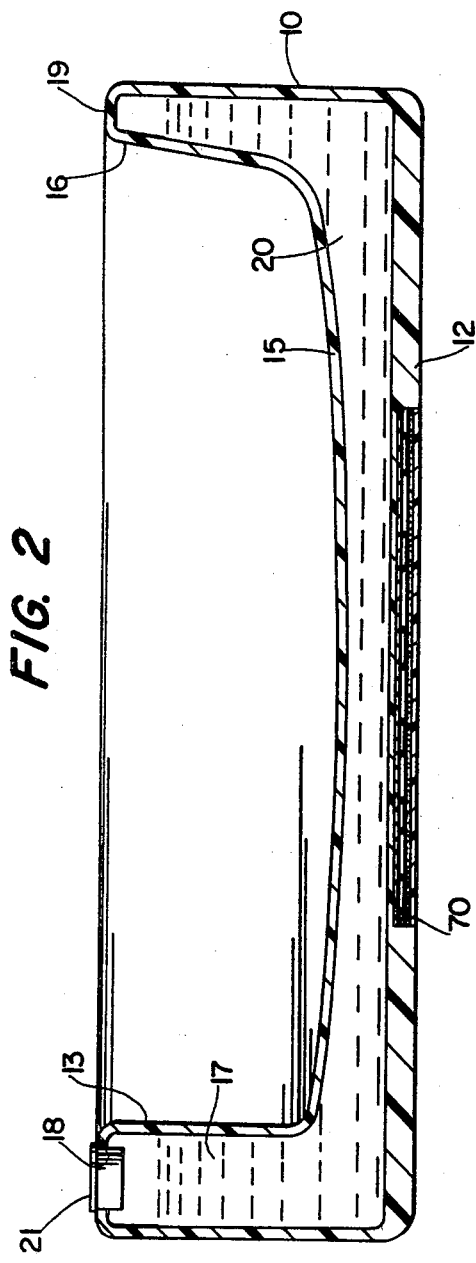
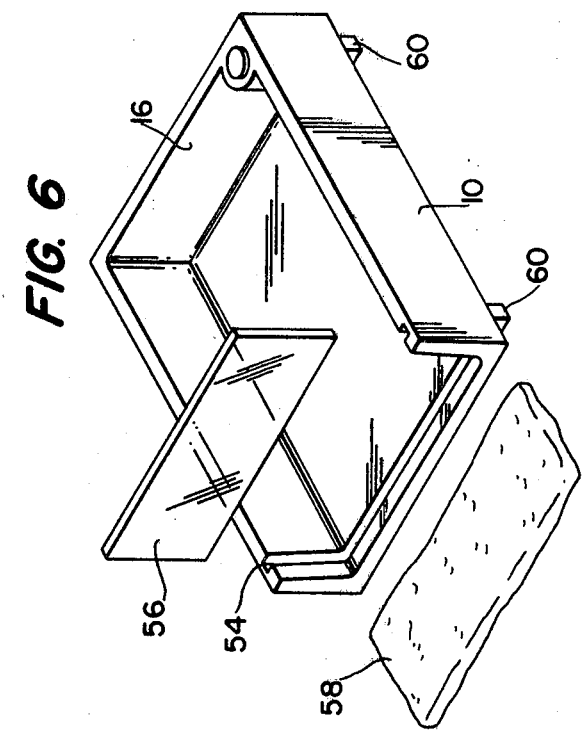
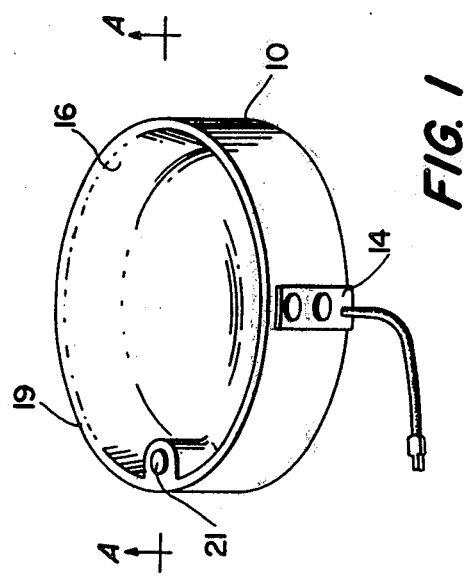

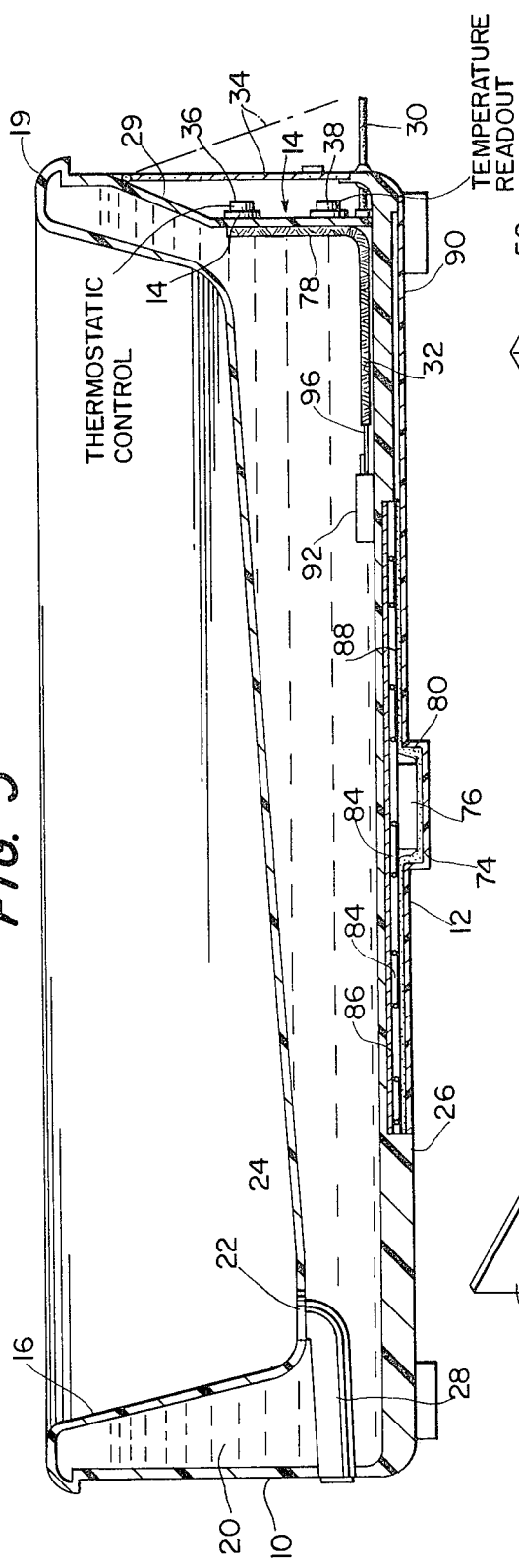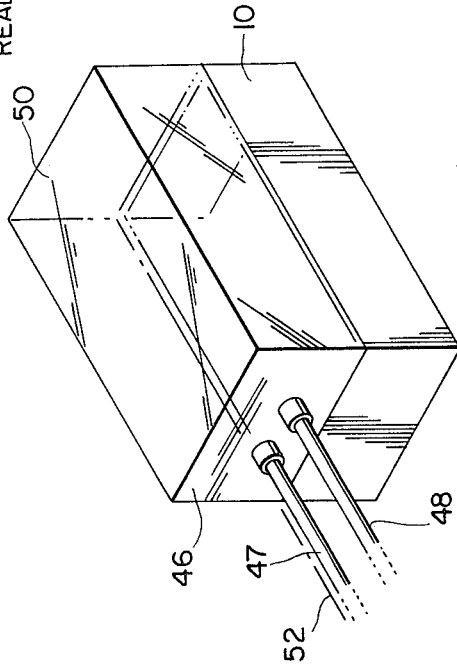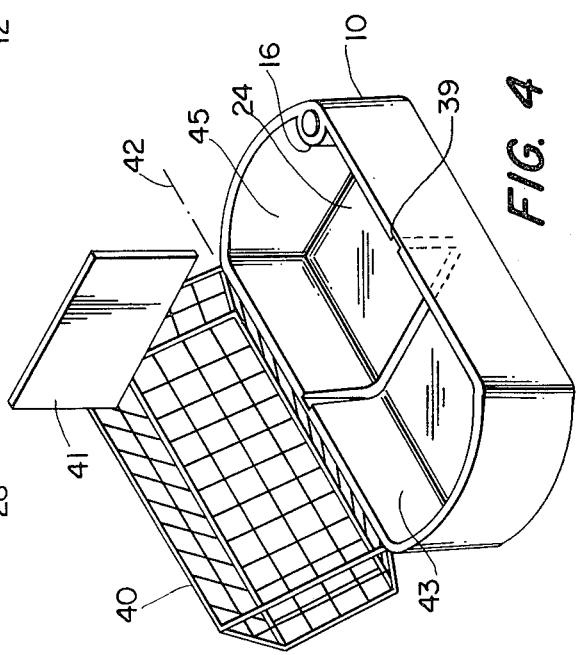

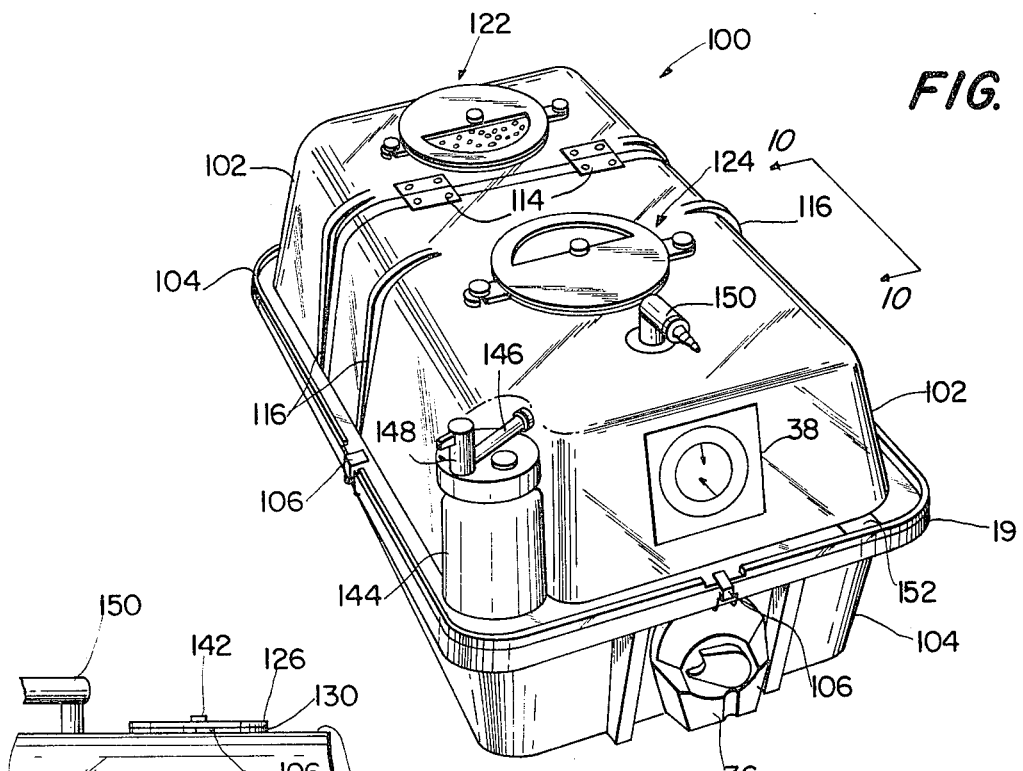
FIG. 8
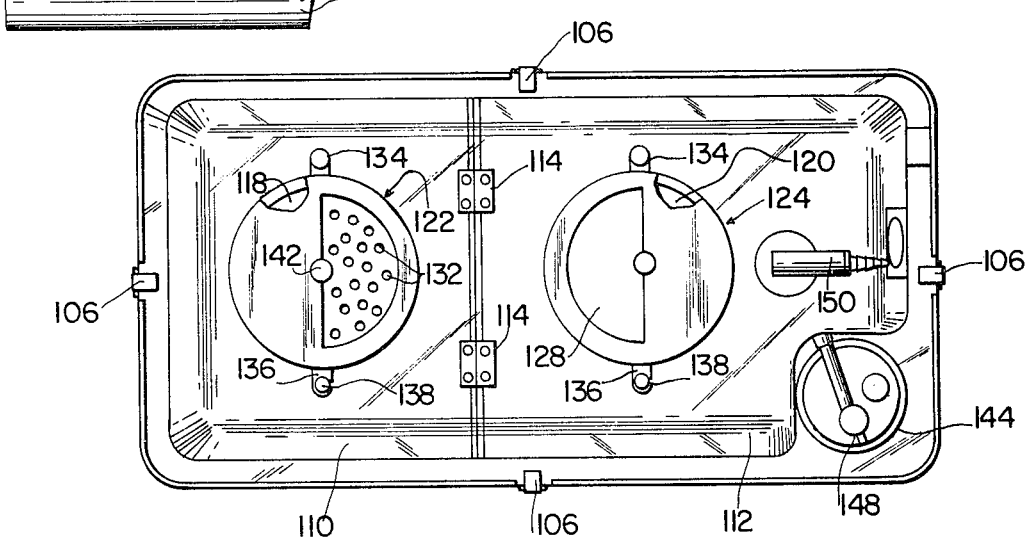
FIG. 10
FIG. 9

HEATED BED FOR ANIMALS

CROSS REFERENCE TO RELATED APPLICATIONS

This application is a continuation-in-part of U.S. Pat. application Ser. No. 807,216 filed June 16, 1977, now abandoned.

FIELD OF THE INVENTION

The present invention is primarily related to apparatus for the care and treatment of animals used in hospitals, clinics, kennels and the home. This invention is further related to apparatus suitable for providing support, protection and controlled even warmth for animals which would benefit therefrom because of sickness, injury or extreme young or old age. Specifically, the instant invention is related to a heated support or bed for animals which can be used alone or in combination with a dome, in which case it could serve as an incubator.

BACKGROUND OF THE INVENTION

Although it is common knowledge that warmth is a vitally necessary ingredient in the care and treatment of animals, particularly, but not limited to, small animals such as dogs or cats, there are few if any commercially available, safe and convenient devices for this purpose. Typical of the patented devices are the heated pet beds of R. D. Huffman shown in U.S. Pat. Nos. 2,980,058 and 3,125,663. These devices are primarily support pads containing electrical heating elements for the comfort and protection of the animal. These and similar devices are mere variations of the obvious use under the animal of an electric heating pad similar to those used by humans. There are two major disadvantages to such devices which render them unsuitable for widespread use. The most obvious problem is that of the danger of the electricity to the animals. It must be assumed that any animal, even if sick or otherwise enfeebled, will chew or claw anything in its immediate environs. Electric pad controls and wiring are dangerous for the animals' normally harmless chewing which could result in electrocution or fire. Many devices, such as the referenced Hoffman devices, have been designed to minimize the danger.

The second more subtle, problem with devices using electrically heated pads to support the animal is the likelihood of producing a hot spot or localized area of increased heat. This is the same problem recognized with electric blankets and heating pads for humans and has resulted in the required warning that such devices should not be used with young children, enfeebled elderly persons or anyone unconscious, immobilized or otherwise incapable of protecting themselves from such problems. This problem, heretofore unsolved for apparatus for pets, has severely limited the use of electric heating pads for animals.

One known device intended for use in providing heat and support for animals is the "T PUMP" and "T PAD" system distributed by Graymar Industries, Inc. of Buffalo, N.Y., which, from published literature appears to be a flat flexible pad having conduits for circulating water and a water pump connected thereto by means of soft flexible hoses. The separate pump includes a heating mechanism of some type which serves to elevate the temperature of water in the pump which is then circulated to the pad. The complexity, cost and vulnerability to damage by the animal limit the widespread use of this device.

Additionally, as the owners of water beds for humans often discover, water beds such as the design by Charles P. Hall shown in U.S. Pat. No. 3,585,356 attract the household pets. Such human water beds are not suitable, however, for convenient use in the care of animals because the thin, flexible vinyl bladder may easily be punctured by tooth or claw with disastrous results. In addition to the obvious size problems, the motion of a flexible water support which humans find so comforting is usually unacceptable to an animal. Further, such water beds cannot be used for the very young animals such as a prematurely born kitten or puppy that could easily fall off the pad or simply crawl away losing the benefits of the warmth.

SUMMARY OF THE INVENTION

The above identified disadvantages of conventionally known devices for these purposes are eliminated by the heated bed for animals of the instant invention. A present embodiment, as may clearly be seen in the accompanying sheets of drawings, and understood with reference to the specification included herein, includes as a basic embodiment an outer shell preferably of plastic surrounding an inner shell of similar plastic which supports the animal. The space therebetween is filled with a liquid having a relatively high thermal capacity such as water. An additive may be conveniently disposed in the liquid to prevent algae growth. The water conducts heat from a heat source, such as an electric resistance heater, to the inner shell and therefore the animal.

In this manner constant even heat is provided to the animal without the danger of hot spots while making the electrical elements inaccessable to the animal. The inner shell is at least somewhat concave so that the animal is at least partially enclosed and protected. This construction provides a water heated bed without requiring circulation of the water.

In alternate embodiments the bed can further include an enclosure, such as a metal or plastic wire cage. For certain applications such as hospital use as an incubator, the enclosure can be a transparent box or dome having openings for hand holes, and an air inlet and air outlet.

Other embodiments of the invention can include a drain hole in the inner shell connected through a pipe to the outer shell so that the support surface for supporting the animal may easily be cleaned or hosed out.

Still further embodiments of this invention, can include an opening at one end of the bed which can serve either of two purposes. A relatively large animal can be positioned in the bed with its head supported by a suitable pillow positioned outside of the bed. Alternatively, the opening can be blocked by transparent window material so that a smaller animal can see out or be seen.

The monitor and control system for the electric heat source may conveniently be mounted on the outer shell for access by an attendant. In an alternate embodiment, such controls may be recessed and protected from tampering by the animal by a transparent door mounted flush with the outer shell.

These and other features and advantages of the invention are contained in the technical disclosure in the following specification read together with the drawings described immediately hereinbelow.

BRIEF DESCRIPTION OF THE DRAWINGS

FIG. 1 is an isometric view of a heated bed for animals according to the instant invention shown in a round configuration.

FIG. 2 is a cross sectional view of FIG. 1 along line AA.

FIG. 3 is a cross sectional view, similar to FIG. 2 of an alternate embodiment showing the drainage system and recessed control panel.

FIG. 4 is an isometric view of an alternate embodiment of the instant invention in an oval configuration showing an opening wire cage cover and also a removable divider and slot therefore, so that one bed may be utilized for two animals.

FIG. 5 is an isometric view of still another embodiment of the instant invention in a rectangular configuration showing a solid transparent cover including oxygen and vapor or mist intake lines for use as an incubator.

FIG. 6 is an isometric view of an alternate embodiment wherein an end wall of the bed is fitted with a removable transparent window or gate through which the animal can see and be seen.

FIG. 8 is an isometric view of an alternative embodiment of the instant invention shown in FIG. 5.

FIG. 9 is a plan view of FIG. 8 taken along line 9—9.

FIG. 10 is a side elevational view of FIG. 8 taken along line 10—10.

DETAILED DESCRIPTION OF THE PREFERRED EMBODIMENTS

Figure 7:
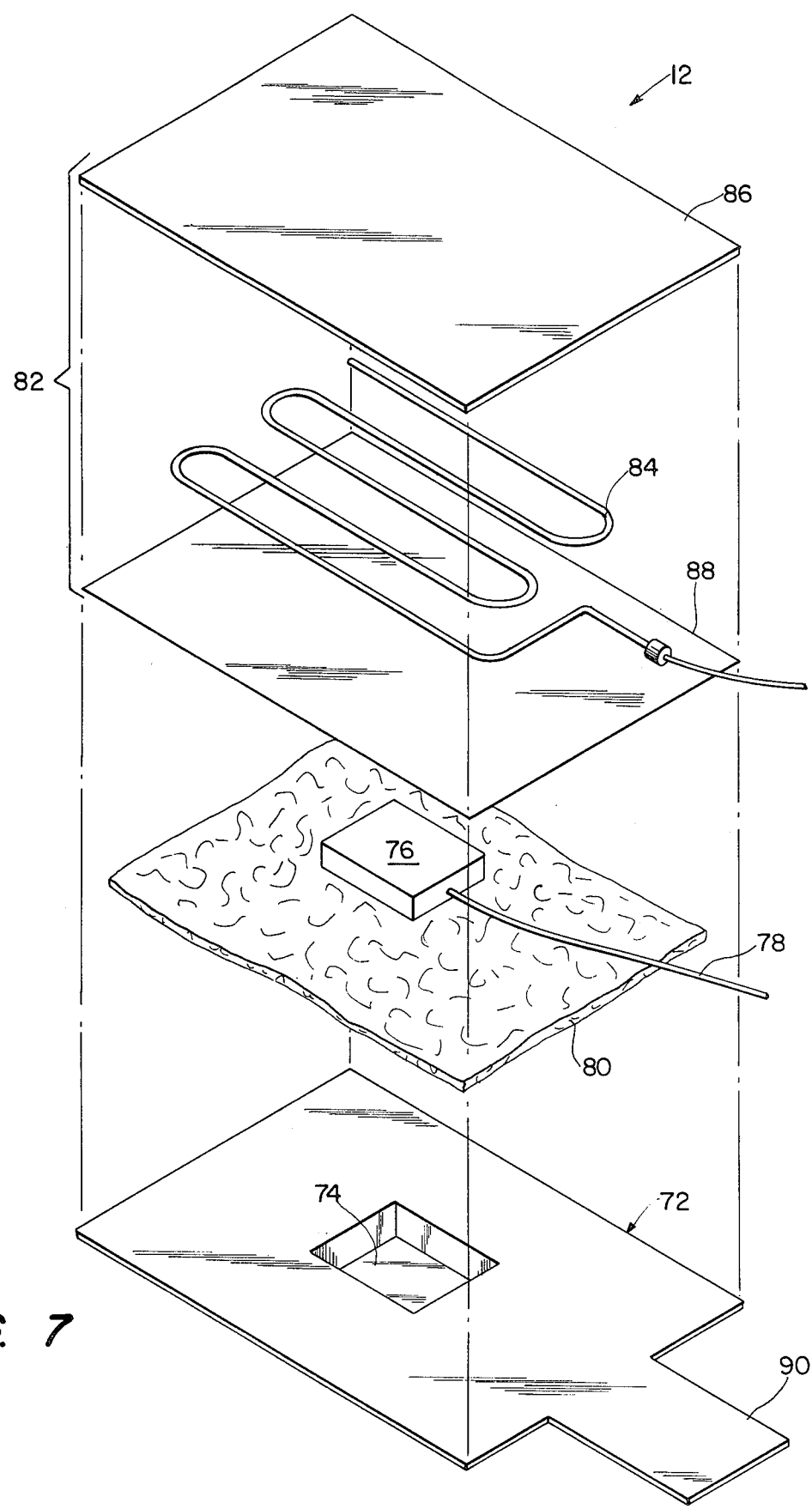
FIG. 7 is an exploded isometric view of a heater assembly.

FIG. 1 is an isometric view of a heated bed for animals according to the instant invention. Outer shell 10 is a hard plastic container within which is positioned liner or inner shell 16 preferably constructed from a durable, relatively hard plastic such as vinyl. It is an important facet of the instant invention that, unlike the water beds designed for human use to which the instant invention is superficially similar, inner shell 16 is not required to provide a buoyant support for the animal positioned therein. Therefore shell 16 can include an easily sanitized, substantially rigid support surface constructed from a durable plastic resistant to puncture by chewing or clawing of the animal. The internal volume 20 formed between inner shell 16 and outer shell 10 is filled with water or some other convenient liquid or similar temperature characteristics. It is important to note that this construction provides a substantially rigid support surface, for the animal which is warmed on its underside by the heat from the temperature controlled water.

Fill port 18 is formed in rim 19 which joins the shells. The water is added through port 18 which may then be sealed by any suitable device such as plug 21. Also shown in FIG. 1 is electrical control panel 14 which may include temperature readout and thermostatic controls for a heating assembly or element 12 depicted in FIG. 2. The thermostat is preferably calibrated so as to control the temperature of water 20, as discussed hereinbelow.

For most applications, water 20 should be maintained between 75°-100° and preferably between 80°-85° for best comfort of the animal over a prolonged period. A commercially obtainable algicide and bactericide can be added to water 20 through fill port 18 so that the same water can be used over a several month period.

FIG. 2 is a cross sectional view of FIG. 1 along line AA. Outer shell 10 is clearly shown with inner shell 16 forming a container for a liquid such as water 20. The container has a U-shaped cross section so as to provide a portion of the container at the relatively vertical walls 13 of the shells with a reservoir area 17. Reservoir area 17 serves both to surround the animal with heat and to provide a reservoir of heated water to insure that the support surface 15 of shell 16 is continuously in contact with the water even if the water level were to drop.

Heating assembly 12 is fixedly attached inside a cavity 70 located in the outer bottom wall of outer shell 10. Heating assembly 12, in one embodiment, is comprised of an integral, laminated structure which is shown in an exploded view in FIG. 8. A molded plastic cover 72, preferably made of the same plastic as outer shell 10, acts as a mounting board on which the other elements of heating assembly 12 can be mounted. Molded into the bottom of cover 72, and projecting downwardly therefrom when assembled, is a box enclosure 74 for covering a safety temperature sensor such as a thermocouple element 76 having a connecting wire 78. A sheet of insulation 80, such as fiberglass insulation, is mounted on cover 72 so that cover 72 does not become too hot. A heating element 82 is comprised of a conventional string-type heating wire 84 formed in a serpentine pattern sandwiched between an upper metal plate 86 and a lower sheet of metal foil 88. The metal plate 86 and metal foil 88 can be made of aluminum and provide a uniform distribution of heat from heating wire 84.

Thus, the heating assembly laminate can be integrally formed by any conventional means between upper and lower supporting surfaces provided by metal plate 86 and cover 72, respectively. Heating assembly 12 can be fixedly mounted inside cavity 70 or can be removeably mounted therein to permit removal thereof for cleaning of the animal bed.

As shown in FIG. 8, thermocouple 76 is located in physical contact with metal foil 88 and, because of its size, extends below the upper surface of cover 72 into box 74 along with the insulation 80. Thermocouple element 76 is a safety thermocouple designed to de-energize the unit should a control thermocouple and its related control, described hereinbelow, not work properly. Also, it is possible that for heating assembly 12 to overheat if energized without the water cavity between outer shell 10 and inner sheel 16 being filled with water. Thus, safety thermocouple element 76 is designed to prevent this overheating. An exemplary setting for activating the thermostat controls (described hereinbelow) is 185° F.

Heating assembly 12 as thus described provides economy in production and uniform heating of the water 20 when in use. In comparison, if the usual immersible type heater rod were used and placed in one small area of the water cavity, the water in that small area would be warmer than the rest of the water lining floor 24. Uniformly heated water could only be obtained with an immersible heater by having either a plurality of such heaters uniformly spaced inside the water cavity or employing a motorized circulation of the water. Obviously, both alternatives are more expensive, increase the complexity of the unit, and increase the weight of the unit. On the other hand, a string type heating wire 84 is adaptable to being placed over a larger area in any desirable shape, thereby providing uniform heating over an enlarged space. As mentioned above, the combination of metal plate 86 and metal foil 88 insure a uniform distribution of the heat to the base 26. Through convection, the heated water in contact with base 26 will rise into the reservoir areas 20 in contact with the substantially vertical walls of inner shell 16. This provides a uniform, natural circulation of the water and an even supply of heat to the inner cavity of inner shell 16.

In addition to being more economical, providing more uniform heat, and being more inexpensive than the conventional immersion heater or a conventional insulated strip heater, heating wire 84 and heating assembly 12 are safer because there is no direct contact with the water. This saves additional cost in assembly by not having to be sealed into the container as in the case of an immersion heater. Furthermore, no part of string heating wire 84 is exposed to the outside of the container and thus cannot be inadvertently contacted by an animal using the heated bed.

As mentioned above, inner shell 16 is made of a rigid durable plastic material. This is important for a number of reasons. Stainless steel or other metallic or heat conductant material is not suitable for use in providing a heated bed for animals. Such surfaces are inherently too good of a heat conductor and therefore it is possible to have transient localized hot spots. These can occur when the heater is energized and heat conduction from the heater provides a higher temperature in a specific area. Transient localized hot spots could lead to burning of the animals. This is especially true of heating devices which do not contain liquid wherein the sensor monitors the temperature of the support surface directly over it. For example, if an animal which was lying on the support surface over the sensing element moves off of the element, the sensing element will call for more heat because it is no longer being insullated. Because of the high thermal conductivity of a metal, a metallic support surface can rapidly conduct this added heat to create a localized hot spot and burn the animal. On the other hand, a plastic support surface 15 is inherently a poor conductor of heat and thus has a delayed reaction to newly added heat. The combination of support surface 15 made of a poor heat conductor, a large thermal capacity of the liquid used to heat support surface 15, the sensor which monitors the temperature of the liquid, naturally circulated, rather than the support surface 15; and the liquid being in full contact with the entire non-supporting side of support surface 15 prevents localized hot spots and provides an even constant heat at lower temperatures.

FIG. 3 is a cross sectional view, similar to FIG. 2, of an alternate embodiment. In the same manner as in the embodiment of FIG. 2, heating assembly 12 is positioned in thermal contact with water 20 but out of physical contact therewith. The configuration of inner shell 16 is modified somewhat, however. A drain port 22 is positioned in floor 24 of inner shell 16 in the lowest portion thereof. As shown in FIG. 3, floor 24 is not level, i.e., not parallel to base 26 of shell 10, but rather slopes downward toward drain port 22 so that the inner surface of the bed in which an animal is positioned can be quickly and easily cleaned by hosing it down with water and disinfectant. Drain port 22 is connected via conduct 28 to the outside of the bed through outer shell 10.

FIG. 3 also shows control panel 14 in a recessed opening 29 formed in outer shell 10. Panel 14 is connected to a source of power, not shown, via line cord 30. The source of power may be the usual AC line voltage provided for household consumers or may even be a source of low voltage DC power, for example 12 volts, which can be used without any feat of harm to the animals. Particularly if a source of AC power is used, it is necessary to provide a properly protected cord, strong enough to withstand any playful gnawing of a non-human animal unless made inaccessible to the animal by (1) extending the cord outside an animal holding cage, or (2) the enclosure by a cage or plastic cover. Panel 14 is connected to heating element 12 via cable 32 which runs in a protected conduit formed between the bottom of base 26 and the top of a tongue section 90 of cover 72. (See also FIG. 7.) Cable 32 can typically contain power leads for heat and also temperature sensor leads or wire 76. Panel 14 is recessed so that opening 29 may be blocked off by hinged door 34 to prevent access by the animal. Door 34 may conveniently be transparent so that thermostatic control 36 and temperature readout 38 of panel 14 may be viewed when door 34 is closed. Any suitable catch, such as a magnetic catch, not shown, which cannot be operated by the animal may be used.

A primary temperature sensor 92 comprised of a thermocouple element 94 and a sensor lead or wire 96 is, for assembly convenience, mounted to the top surface of base 26 in direct physical contact with the water, when the cavity is filled, with means such as water proof adhesive. Wire 78 is then connected to electrical control panel 14 through an internal connection, as shown in FIG. 3 or by being fed between inner shell 16 and outer shell 10 at rim 19.

FIG. 4 is an isometric view of another alternate embodiment of the instant invention showing wire cage cover 40 constructed from a suitable material such as plastic or metal and hinged along axis 42 so that after positioning the animal on floor 24, the animal may be restrained within the bed if desired. It must be noted at this point that the actual container shape used is a matter of convenience bearing in mind the particular animal to be served.

FIG. 4 also shows a groove 39 formed in the surface of inner shell 16 in which may be positioned a divider, such as divider 41. Divider 41 serves to separate the interior of the shell into compartments 43 and 45 so that more than one animal may be accommodated in one bed at the same time. Obviously, more than one divider can be provided so that larger units can be separated into more than two compartments. As desired all or only some of the compartments can be over a heated fluid containing cavity. A non-heated compartment could be provided so that an animal that is uncomfortable in a compartment having a heated floor could move to one without.

FIG. 5 is an isometric view of still another embodiment of the instant invention for use as an incubator. Outer shell 10, shown in the embodiment as rectangular in shape, has mounted thereon a plate 46 through which are connected various life support media, such as oxygen and mist, via conduits 47 and 48. A suitable transparent cover having three sides and a top such as plastic cover 50 may be hinged to outer shell 10 for opening along axis 52 to form a convenient incubator.

FIG. 6 shows an alternate embodiment of the instant invention in which outer and inner shells 10 and 16 are formed without one end wall, as shown at the leftmost side of the figure. A groove 54 is formed on inner shell 16 so that a gate window 56 may be positioned therein to replace the missing end wall. Window 56 may conveniently be constructed of a transparent material such as clear plastic so that the animal can see out and can be seen. Additionally, window 56 may be removed and a suitably sized support, such as a pillow 58 may be positioned adjacent to the opening provided by the missing wall so that an animal, relatively large with respect to the bed, may be positioned in the bed with its head on pillow 58.

Also shown in this figure are feet 60 which serve to support the bed above the surface of the floor or table upon which it is placed.

With reference now to FIGS. 8, 9, and 10, yet another embodiment of the present invention is depicted in which the heated bed 100 includes a clear, heavy guage plastic dome 102 removably mounted on a container base 104. Base 104 is substantially similar to that depicted in FIG. 3 and therefore need not be further described. As shown in FIG. 10, dome 102 is removably mounted and spaced above base 104 with conventional over-the-center type latches 106 of the type conventionally found on luggage. Four latches 106 are preferably provided, one latch on each of the four rectangular sides of heated bed 100. Dome 102 is spaced above 104 by plastic, U-shaped spacers fixedly attached at their base and depending downwardly from the peripheral edge of dome 102 such that the arms of spacer 108 can engage rim 19 of base 104. Spacers 108 provide an air gap that is essential for providing the convective air flow between the outside environment and the interior of heated bed 100, as described in greater detail hereinbelow. A plurality of spacers 108 can be provided as necessary to insure a stable mounting of dome 102 on base 104.

Dome 102, as base 104, is preferably made from a heavy guage plastic material. As mentioned above, dome 102 is transparent and base 104 can be either transparent or preferably opaque. Dome 102 is preferably molded and has a number of fittings mounted thereon. In addition, dome 102 is divided transversely so as to form two sections, a door section 110 and a body section 112. Door section 110 is pivotally mounted to body section 112 with conventional all plastic hinges 114 such that door section 110 can be opened for placement or removal of an animal into heated bed 100. A plurality of ribs 116 are provided on body section 112 to give it added rigidity and strength.

Two hand ports 118 and 120 are respectively provided on the top of door section 110 and body section 112 so that access can be obtained to the internal space of heated bed 100. Normally, hand ports 118 and 120 are covered by covers 122 and 124, respectively. Covers 122 and 124 are identical and each is comprised of an upper disc 126 having a semi-circular segment portion 128 removed therefrom and a lower disc 130 having a plurality of perforations 132 therethrough located in a semi-circular segment portion thereof. Lower disc 132 is further provided with mounting ears 134 and 136. Two mounting screws 138 fixedly, but rotatably attaches mounting ear 134 to the top of dome 102 and releasably mounts mounting ear 136 to the top of dome 102, respectively. Mounting ear 136 has a notch 140 cut therein so that when the corresponding mounting screw 138 is loosened, lower disc can be pivoted about the other mounting screw and thereby uncover hand port 120. Upper disc 126 is mounted to lower disc 130 with a centrally located screw 142 so as to permit relative rotation therebetween. Thus, upper disc 126 can be rotated such that semi-circular segment portion 128 uncovers perforations 132, thereby permitting venting of the interior of heated bed 100, or so as to block all or some of perforations 132.

Mounted in an indentation at one corner of dome 102 is a conventional aspirator bottle 144 that is directly connected to the interior of dome 102 through a conduit 146. An air or oxygen line can be attached to either a fitting 148 mounted on the top of aspirator bottle 144 or a fitting 150 mounted on the top of dome 102 and providing fluid communication with the interior of dome 102. Aspirator bottle 144 can be used as a himidifier if filled with water or for supplying medication. In addition, oxygen can be bubbled through water in the humidifier to avoid the drying effect of pure oxygen.

Provision is also made at the other front corner of dome 102 to support a conventional I.V. bottle holder stand (not shown). These stands are usually made from a bent metal rod having an L-shaped base with an upright pole attached at the lower end thereof. The means for holding the L-shaped base of the I.V. holder includes three inverted L-shaped blocks 152 mounted at one end to the edge of dome 102 with the other side extending inwardly toward the upright wall portion of dome 102.

Guage 38 located on the forward end on dome 102 not only provides a temperature readout, but also provides a humidity reading of the air inside heated bed 100. An optional oxygen monitor can also be provided to indicate the percentage of oxygen inside heated bed 100 when oxygen is being introduced through either fitting 148 or 150.

The operation of heated bed 100 is similar to that described herein above with respect to the uncovered heated bed depicted in FIGS. 1 through 3. Convective heat is transferred from heating assembly 12, through base 26, water 20 in the cavity between outer shell 10 and inner shell 16, and through floor 24 to the patient. The heat is needed in all cases of hypothermia from effect of anesthesia used in surgery, debilatation from disease, or trauma and shock, as well as to maintain body temperature in newborn animals. The addition of dome 102 provides a more controlled environment and a facility for adding medication, water vapor, oxygen and/or other gases. The radiant heat from floor 24 heats the air and creates a air flow upwardly and out the uncovered preforations 132 in covers 122 and 124. Air enters the enclosed area through the spacing between the lower peripheral edge of dome 102 and the upper rim 19 of base 104. This spacing can be typically ⅛ inch. Heat also radiates from the vertical walls of inner shell 16 and is added by the body temperature and breath of the patient. The temperature and humidity within heated bed 100 can be determined from readout 38 and can be adjusted by controlling the flow of air through aspirator bottle 144 acting as a humidifier, by controlling the temperature of water 20 with thermostatic control 36, and by controlling the airflow out of hand ports 118 and 120. It is noted that this airflow is extremely important so as to prevent too much heat from accumulating inside heated bed 100. Provision is also made for two small cutouts (not shown) located at each of the two lower, rear corners of door section 100 to facilitate the use of I.V. tubes, patient-monitoring devices, or other connections to the patient.

It is apparent from the above specification that my heated bed for animals is relatively inexpensive to manufacture, convenient to use and provides a degree of care and protection for the animal not available before. Many modifications and changes may be made to the preferred embodiments shown herein without departing from the spirit or scope of my invention which is defined by the claims appended hereto. In particular, the size and shape of the bed is dependent upon the size and shape of the animal to be accommodated thereby. The overall size of a convenient rectangular shaped bed would be in the range of approximately 11 to 20 inches wide, 14 to 36 inches long and 1½ to 12 inches deep. Hand ports 118 and 120 can be 5 inches in diameter and covers 112 and 124 6 inches in diameter.

Heated bed 100 can also have other shapes, such as a thoracic positioner for use as a surgery table having a concaved or v-shaped floor 24 so that the patient can be positioned on its back. A flat version having a tower containing a reservoir of water and located at one end can be used for animals kept outdoors. Base 104 can also be covered by a wire bird cage in which resting bars are provided for bird perching. A base 104 can also be used to surround the lower portion of an aquarium and to replace the imersible heaters not conventionally used. Other uses and modifications of the heating bed would be obvious.

I claim:

1. A heated bed for animals such as dogs and cats comprising a shell means comprising an outer shell and a complementary inner shell, said outer shell providing an enclosure and having a base and substantially vertical walls, said complementary inner shell being of substantially rigid plastic and having a concave surface adapted to support and partially surround such animals, said outer and inner shells having spaced apart walls and bases adapted to receive liquid, said outer and inner shells being joined at their upper edges in the form of a curved lip to provide a narrow, enclosed, liquid reservoir for said liquid which is in direct thermal contact with the base and relatively vertical walls of said inner shell, the base of said inner shell being sloped from one end to the other, said shell means being provided with a fill port for said liquid reservoir, means in the bottom of said outer shell means providing a centrally located area for a selectively controlled electrical heating assembly laminate, a selectively controlled electrical heating assembly laminate mounted in said area, said laminate comprising a heating element sandwiched between an upper metal plate and a lower metal foil, said metal plate contacting the outer shell, and a safety thermocouple below said metal foil covered with a layer of insulation, a plastic cover for said area, means providing a recessed opening in one of the vertical walls of the outer shell, a control means in said recessed opening electrically connected to said heating element, and a temperature sensing means mounted on the top surface of the base of said outer shell and electrically connected to said heating element.

2. An animal incubator comprising the heated bed of claim 1 in combination with a dome of transparent plastic material removably mounted on said bed so as to provide an internal enclosed space between said shell means and said dome, a plurality of spacer means between said dome and said cover to provide an air passage therebetween, said dome comprising a door section pivotably mounted to a body section, adjustable vent means on said dome and fitting means on the dome providing fluid communication with the interior of said dome.

* * * * *